United States Patent
Sakashita et al.

(10) Patent No.: US 8,179,384 B2
(45) Date of Patent: May 15, 2012

(54) IMAGE DISPLAY DEVICE AND METHOD FOR DISPLAYING AN IMAGE ON THE BASIS OF A PLURALITY OF IMAGE SIGNALS

(75) Inventors: Yukihiko Sakashita, Kanagawa-ken (JP); Mamoru Miyawaki, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1355 days.

(21) Appl. No.: 11/468,262

(22) Filed: Aug. 29, 2006

(65) Prior Publication Data

US 2007/0013686 A1   Jan. 18, 2007

Related U.S. Application Data

(62) Division of application No. 10/798,314, filed on Mar. 12, 2004, now Pat. No. 7,148,906, which is a division of application No. 09/760,649, filed on Jan. 17, 2001, now Pat. No. 6,828,986.

(30) Foreign Application Priority Data

Jan. 31, 2000 (JP) .................................. 22944/2000

(51) Int. Cl.
*G09G 5/00* (2006.01)
*G06F 3/038* (2006.01)

(52) U.S. Cl. ........ 345/204; 345/629; 345/635; 345/753; 345/759; 345/156; 345/173; 345/169; 345/1.3; 345/2.1; 345/2.3

(58) Field of Classification Search ............ 345/629, 345/753, 759, 635, 204, 156–157, 1.3, 2, 345/1, 2.3, 169, 173–174
See application file for complete search history.

(56) References Cited

U.S. PATENT DOCUMENTS

| 5,764,277 A | * | 6/1998 | Loui et al. .................. 348/14.01 |
| 5,943,097 A | | 8/1999 | Horii |
| 6,091,408 A | | 7/2000 | Treibitz et al. |
| 6,215,523 B1 | * | 4/2001 | Anderson ................ 348/333.05 |

(Continued)

FOREIGN PATENT DOCUMENTS

JP   5-344317   12/1993

(Continued)

OTHER PUBLICATIONS

Japanese Office Action dated Apr. 13, 2010 concerning Japanese Patent Application JP 2000-022944.

(Continued)

*Primary Examiner* — Lun-Yi Lao
*Assistant Examiner* — Insa Sadio
(74) *Attorney, Agent, or Firm* — Fitzpatrick, Cella, Harper & Scinto

(57) ABSTRACT

Image signals input via input terminals are selected by a selector. The selected image signals are combined and displayed on the same screen of a display device. The display screen includes one main screen and a plurality of sub screens. In the case where a moving image is displayed on the main screen, images displayed on the sub screens are updated when the moving image displayed on the main screen are in a still state. The modes of the image signals are detected only when they are input for the first time, the process performed upon the image signals input after that is controlled in accordance with information stored in a memory.

7 Claims, 14 Drawing Sheets

U.S. PATENT DOCUMENTS

| | | |
|---|---|---|
| 6,335,746 B1 | 1/2002 | Enokida et al. |
| 6,515,704 B1 | 2/2003 | Sato |
| 6,828,986 B2 | 12/2004 | Sakashita et al. |
| 6,860,609 B2 | 3/2005 | Olson et al. |
| 7,020,475 B2 * | 3/2006 | Bahl et al. ............... 455/456.1 |
| 2005/0096068 A1 * | 5/2005 | Bahl et al. ............... 455/456.1 |

FOREIGN PATENT DOCUMENTS

| | | |
|---|---|---|
| JP | 7-181937 A | 7/1995 |
| JP | 11-239307 | 8/1999 |
| JP | 11-308550 | 11/1999 |

OTHER PUBLICATIONS

B.A. Myers, et al., "Collaboration Using Multiple PDAs Connected to a PC", ACM 1998, pp. 285-294.

Japanese Office Action dated Nov. 24, 2010 issued during prosecution of related Japanese application No. 2000-022944.

* cited by examiner

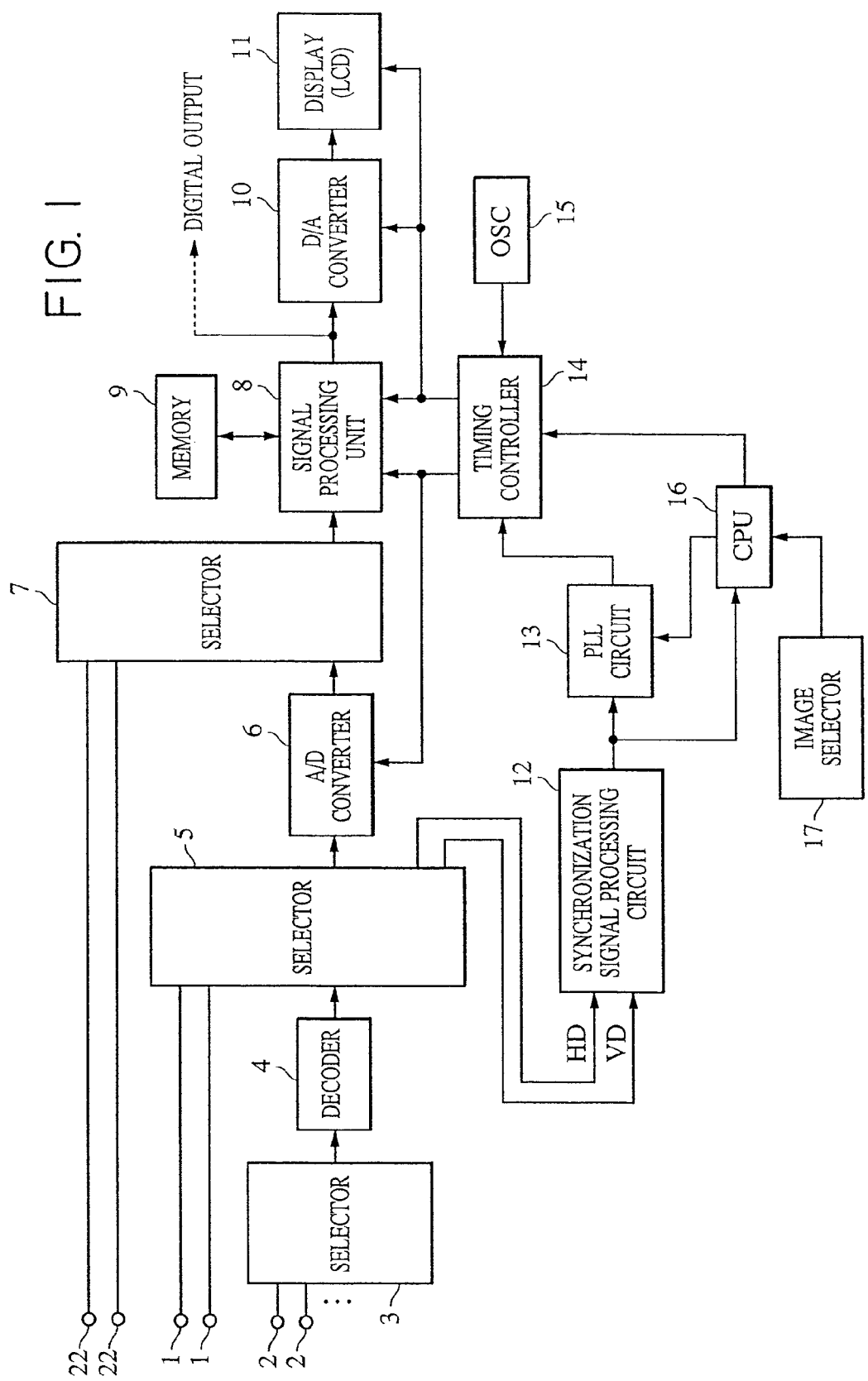

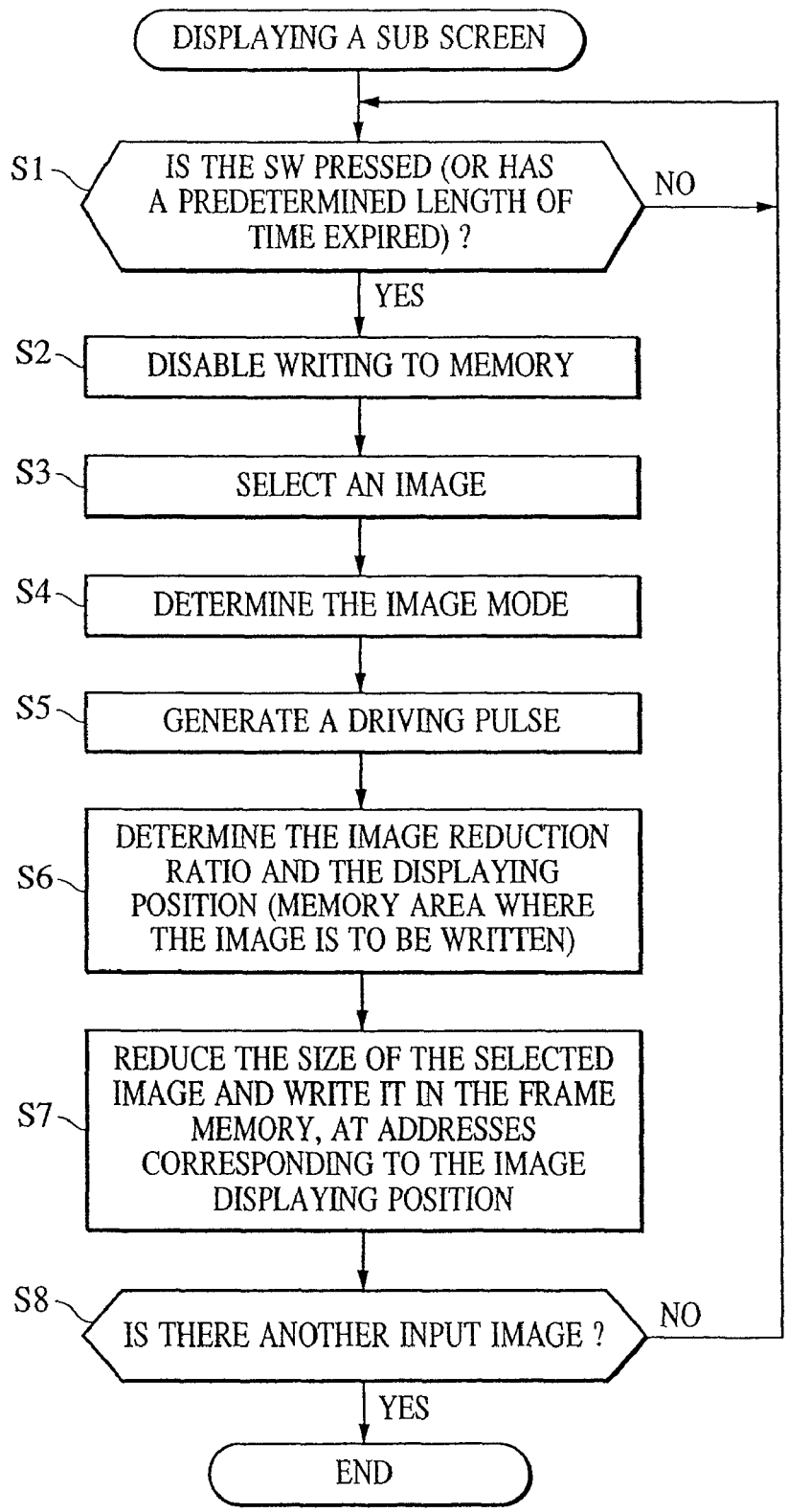

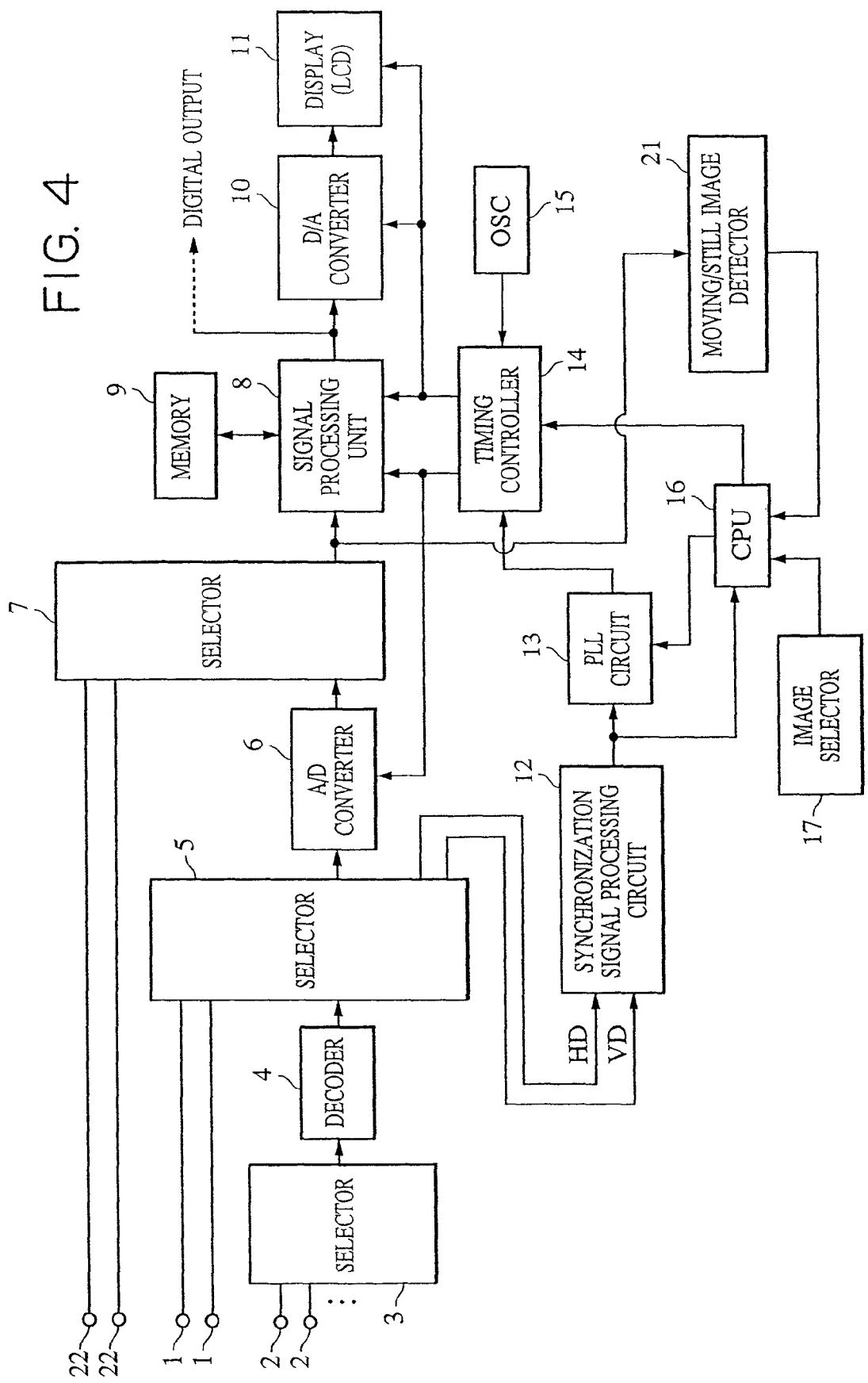

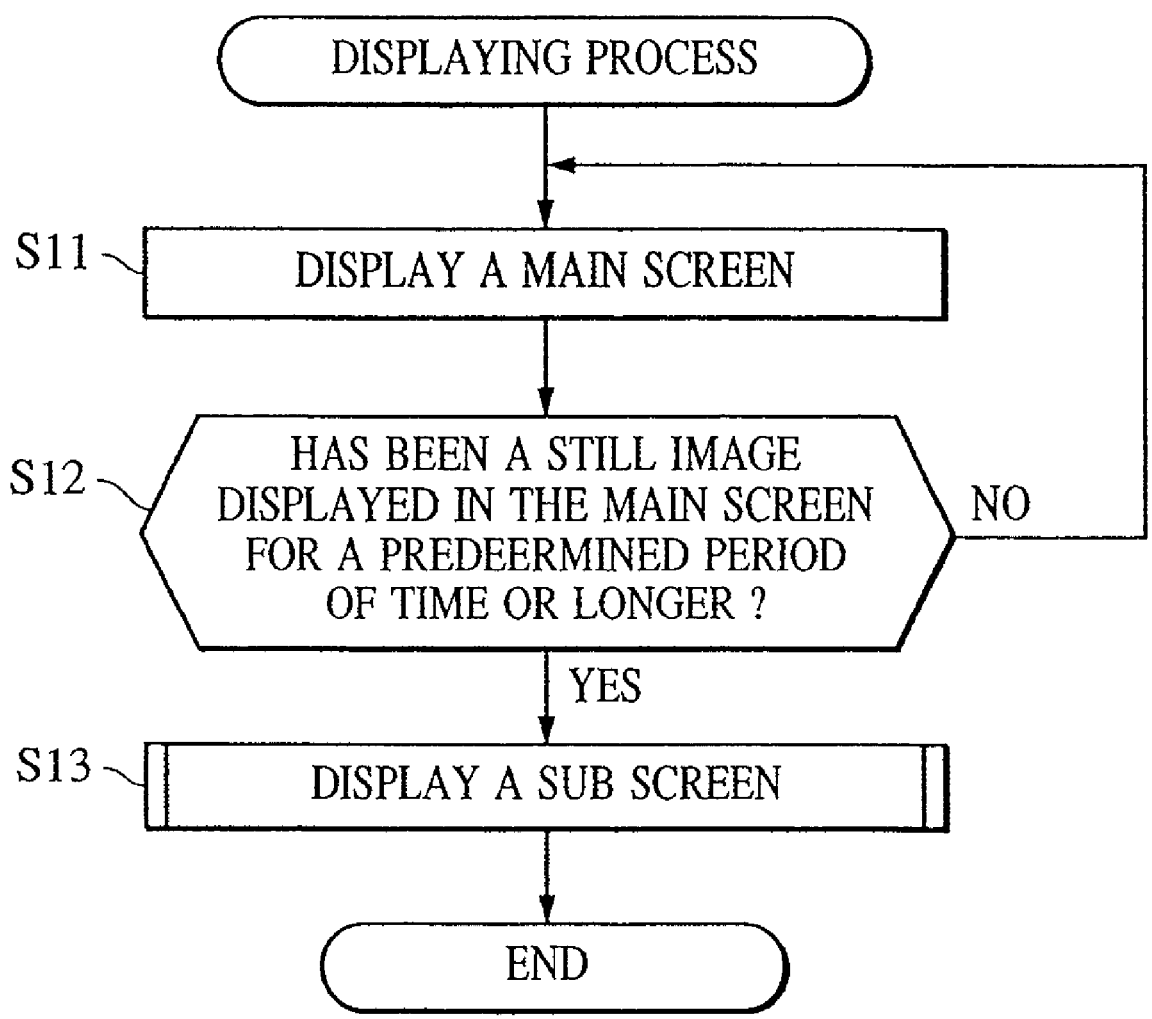

(PRIOR ART)

IMAGE DISPLAY DEVICE AND METHOD FOR DISPLAYING AN IMAGE ON THE BASIS OF A PLURALITY OF IMAGE SIGNALS

This application is a divisional application of application Ser. No. 10/798,314, filed on Mar. 12, 2004 (pending) which is a divisional of application Ser. No. 09/760,649 filed on Jan. 17, 2001, now U.S. Pat. No. 6,828,986, issued on Dec. 7, 2004.

BACKGROUND OF THE INVENTION

1. Field of the Invention

The present invention relates to an image display device and method for displaying an image signal selected from a plurality of image signals input from the outside and switching the image signal being displayed as desired.

2. Description of the Related Art

In the art of image display devices, it is known to select one of a plurality input image signals using a mechanical or electrical switch and display the selected image signal. FIG. 14 is a block diagram illustrating an example of such a conventional image display device.

In FIG. 14, a plurality of personal computers (PCs) 101, a DVD (digital versatile disc) player 102, and a terminal 103 for outputting an image signal are connected to a display device 105 via an image signal selection switch (SW) 104. The display device 105 displays an image signal selected by the image signal selection switch 104, that is, an image output from one of the personal computers 101 or the DVD player 102.

When the convention image display device is used, in a meeting or the like, to display images such that an image signal is selected from those output from a plurality of personal computers or terminal devices connected to the display device and the selected image signal is displayed using a large-screen display device such as a projector, there is a possibility that the image signals output from the PCs or the terminal devices are based on different standards, and thus it is required that the image display device should have the capability of handling the image signals based on various different standards. Even if the image display device has such a capability, the image display device can still have a problem. That is, when the input image signal is switched, the image mode is detected from the synchronization signals HD (horizontal deflection) and VD (vertical deflection) after the new input signal has become stable, and then the oscillation frequency of a PLL circuit is determined and the displaying position and the sampling phase are adjusted. Therefore, it takes a long time for the displayed image to become stable. The displayed image can have a disturbance during such a transient period.

Another problem of the conventional image display device is in that only one image signal selected from the plurality of input image signals can be displayed at a time, and thus it is impossible to know the contents of the other image signals.

When a projector is used in a meeting to display an image signal selected from image signals output from a plurality of PCs and the image being displayed is switched as required, it is impossible to know the contents of the image signals other than the image signal being currently displayed. This is inconvenient for the attendants at the meeting. The image signals output from the respective PCs can be different in characteristics (such as a frequency) from each other, it takes a long time to achieve a stable state after switching the image being displayed even if the display device has the multiscan capability, and the image being displayed can be disturbed. In particular, in a meeting or education system in which a large-screen display device is used to display an image signal selected from the image signals output from a plurality of PCs and switch the image being displayed as desired, the above-described problems are serious.

In recent years, the quick and great advance in the technology of mobile terminal devices have made it possible for ones to store necessary data in their own mobile terminal devices and to obtain data by accessing a server via their own terminal devices. This allows ones to do jobs without having restrictions in terms of time and place, and thus greater productivity of jobs can be achieved. When a meeting is held in such an environment, attendants want to make a discussion on the basis of data output from their own mobile terminal devices.

However, in the conventional image display device, the simple selection switch 104 used to connect a plurality of devices causes the following problems. That is:

1) Complicated and troublesome cable connections are required. In particular, the small size of mobile terminal devices results in a limitation in the type of cable. Furthermore, in many cases, an additional module is required for connection to the video output terminal. This makes the cable connection more complicated and troublesome. A connection to a projector for displaying on a large screen an image output from a PC in a meeting is generally made using a VGA (Video Graphic Array) cable having a D-Sub (Subminature-D) 15-pin connector with a large size. The large connector size and the recent tendency of projectors to have reduced sizes limit the number of input terminals of the projectors up to two, one of which is generally used for connection with a PC and the other is used as a video input terminal. Although some high-end projectors have two or three input terminals for connection with PCs and for video inputs, respectively, the number of devices which can be connected is still limited.

2) When a VGA cable is used, the VGA cable having a large diameter and a small length on the order of 2 m limits the location of a mobile terminal device. Thus, an attendant has to move his/her mobile terminal device to a location which allows the terminal device to be connected to the cable whenever it is required to output data in a meeting. Thus, time is spent uselessly for connection, and the connecting operation often breaks the meeting.

3), It takes a long time to achieve a stable state in the displaying of an image after switching the image being displayed. This has been described in detail above, and thus no further description is given.

4) only the image signal output from the device of the presenter is displayed, and the images of the other attendants cannot be displayed. This has also been described above, and no further description is given.

5) It is impossible to create or edit data from a plurality of data and transmit the resultant data to the attendants.

When a discussion is made among a large number of attendants, it is desirable, in order to achieve high productivity in jobs, not only to present data of the respective attendants but also to distribute the conclusion of the discussion to the attendants immediately in the meeting. However, the conventional image display device is only capable of displaying one received image signal, and is not capable of distributing the data being displayed. Thus, needs described above cannot be met.

SUMMARY OF THE INVENTION

In view of the above, it is an object of the present invention to provide an image display device, a method of controlling an image display device, and a storage medium on which a program for controlling an image display device is stored, which make it possible to display at-a-glance views of the contents of input image sources and also make it possible to quickly switch an image being displayed without causing a disturbance.

According to an aspect of the present invention, to achieve the above object, there is provided an image display device comprising a plurality of input terminals for inputting a plurality of image signals, respectively; and combining and displaying means for combining the plurality of image signals input via the input terminals and displaying the resultant image on the same screen of the display device.

Preferably, the image display device further comprises selection means for selecting an image signal to be displayed as a main image from the image signals combined and displayed on the same screen of the display device; and still state detection means for, when the image signal selected as the main image is a signal of a moving image, detecting a period of time during which said moving image is in a still state over a predetermined length of time or longer, on the basis of the image signals, wherein the images other than the main image are updated when the still state detection means detects that the moving image is in the still state.

Further objects, features and advantages of the present invention will become apparent from the following description of the preferred embodiments with reference to the attached drawings.

BRIEF DESCRIPTION OF THE DRAWINGS

FIG. 1 is a block diagram illustrating the general configuration of an image display device according to a first embodiment of the present invention;

FIG. 2 is a flow chart illustrating a sub screen displaying process executed by the image display device shown in FIG. 1, and more particularly, mainly by a CPU thereof;

FIG. 4 is a block diagram illustrating the general configuration of an image display device according to a second embodiment of the present invention;

FIG. 5 is a flow chart illustrating a displaying process executed by the image display device shown in FIG. 4;

DESCRIPTION OF THE PREFERRED EMBODIMENTS

Figure 3A:
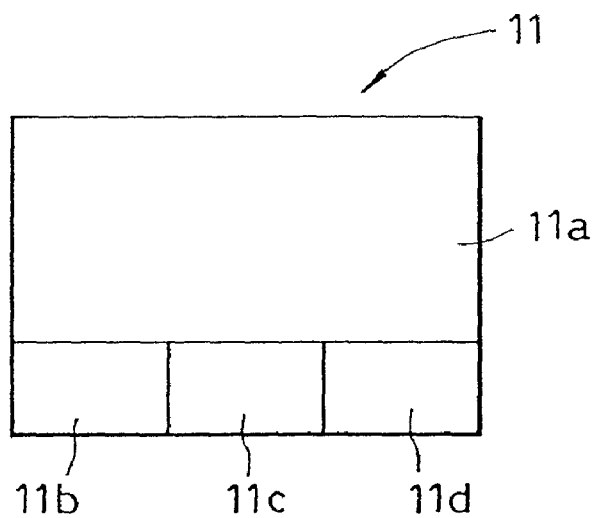
FIGS. 3A to 3C are schematic diagrams illustrating examples of at-a-glance views of input images displayed by the sub screen displaying process shown in FIG. 2.

The present invention is described in further detail below with reference to preferred embodiments in conjunction with the accompanying drawings.

FIG. 1 is a block diagram illustrating the general configuration of an image display device according to a first embodiment of the present invention.

In FIG. 1, a plurality of input terminals 1 for inputting analog image signals are directly connected to a selector 5 for selecting one of analog image signals and outputting the selected analog image signal.

A plurality of input terminals 2 for inputting video signals such as composite signals are connected to a selector 3, which selects one of the video signals input to the selector 3 via the input terminals 2 and outputs the selected video signal. The output of the selector 3 is connected to the input of a decoder 4, and the output of the decoder 4 is connected to an input of the selector 5.

The output of the selector 5 is connected to a selector 7 via an A/D converter 6.

The output of the selector 7 is connected to a signal processing unit 8.

A memory 9, a D/A converter 10, and a timing controller 14 are also connected to the signal processing unit 8.

The output of the D/A converter 10 is connected to a display 11 such as an LCD (liquid crystal display).

A synchronization signal processing circuit 12 is connected, via a PLL (phase locked loop) circuit 12, to an input of the timing controller, and an OSC (oscillator) 15 and a microcomputer (CPU) 16 are connected to the other inputs of the timing controller 14.

An image selector 17 is connected to the CPU 16.

Analog image signals and synchronization signals HD and VD output from a PC (personal computer) or the like are input via the analog input terminals 1. The video signal input via one of the input terminals 2 is separated by the decoder 4 into an image signal and synchronization signals HD and VD.

One of the image signals input via the input terminals 1 and 2 is selected by the selectors 3 and 5, and the selected image signal is converted by the A/D converter 6 into a digital signal and input to the signal processing unit 8.

A plurality of video terminals 22 for inputting video signals are also connected to the selector 7. The selector 7 selects one of the digital image signals input via the input terminals 22 or the digital image signal output from the A/D converter 6. The selected digital image signal is output to the signal processing unit 8.

The signal processing unit 8 adjusts the contrast and the brightness. The signal processing unit 8 also serves to increase or reduce the size of images in multiscan processing.

The memory 9 is also used as a buffer memory in the signal processing described above.

The signal output from the signal processing unit 8 is converted by the D/A converter into an analog signal which is used to drive the display 11.

Of the image signal and the synchronization signals HD and VD selected by the selector 5, the image signal 5 is input to the A/D converter 6. On the other hand, the synchronization signals HD and VD are input to the synchronization signal processing unit 12. The synchronization signal processing unit 12 detects the image mode of the input signal, on the basis of the timing of the synchronization signals HD and VD.

Herein, the detection of the image mode is performed on the basis of the timing of the synchronization signals HD and VD, and the oscillation frequency of the PLL circuit 13 is determined depending upon the detected image mode. The image displaying position and the sampling phase are also controlled depending upon the image mode.

The image selector 17 selects one of input images (to be displayed) in accordance with a command given via a remote control unit (not shown) or an external switch (not shown). The image selector 17 also displays information about the selection.

The controlling process executed by the image display device constructed in the above-described manner is described below with reference to FIGS. 2 and 3.

FIG. 2 is a flow chart illustrating the process of displaying a sub screen, executed by the image display device, and more particularly mainly by the CPU 16, according to the present embodiment of the invention.

In FIG. 2, if an at-a-glance view start signal is input, writing into the frame memory is disabled after writing one frame of the current signal being processed into the frame memory (step S1 and S2). Herein, the reading of the image signal from the memory and the displaying it on the display 11 are continued.

After that, a different image signal is selected by switching the selector 3/and/or the selector (step S3).

The mode of the image signal is detected on the basis of the vertical synchronization signal VD and the horizontal synchronization signal HD of the switched image signal (step S4). In accordance with the detected mode of the image signal, the setting of the PLL circuit 13, the signal processing unit 8, and the timing controller 14 is performed so as to acquire the image signal in an optimal fashion. (step S5) The displaying position and the reduction ratio of the selected image are then determined (step S6), and data is written in the memory, at memory addresses corresponding to the determined displaying position and the reduction ratio (step S7).

The above process (steps S1 to S7) is performed repeatedly as many times as there are input images (step S8) thereby displaying the images arranged in the form of an array to provide an at-a-glance view.

The above-described sub screen displaying process may be performed only when an at-a-glance view switch (not shown) is pressed or may be performed repeatedly at fixed intervals.

The determination of the mode of the image signal in step S4 may be performed for each input terminal only when initialization is performed. In this case, the data representing the modes of the image signals input via the respective input terminals or the control data therefor is stored in a storage device (not shown) disposed in or connected to the CPU 16 thereby allowing the process to be performed in accordance with the content stored in the storage device without performing the determination of the mode and without performing the calculation of the control data associated with the displaying position adjustment and the sampling phase adjustment of the image signals except in the initialization process.

In this case, because the determination of the mode and the calculation of the control data for the adjustment of the displaying position and the sampling phase of the image signals are not performed every time, it is possible to quickly perform the process of displaying the sub screen. The contents stored in the storage device may be updated by reperforming the initial setting.

Figure 3B:
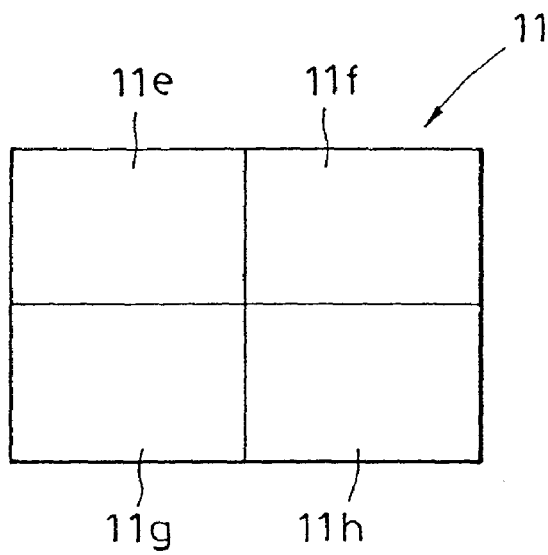
Figure 3C:
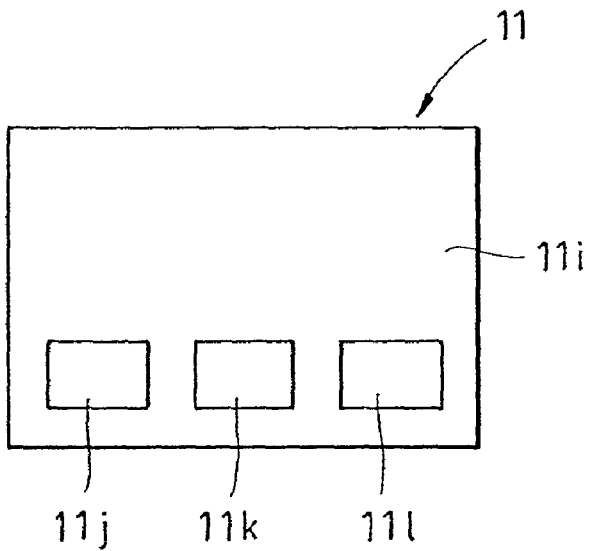

FIGS. 3A to 3C illustrate examples of sets of at-a-glance views of input images displayed by the above-described sub screen displaying process.

FIG. 3A illustrates an example in which sub screens 11b to 11d are displayed below the main screen 11a. FIG. 3B illustrates an example in which the screen is divided such that the main screen lie and sub screens 11f to 11h have the same size. FIG. 3C illustrates an example in which a plurality of sub screens 11j to 11l are overlayed on a main screen 11i.

Now, an image display device according to a second embodiment of the present invention is described below.

In the first embodiment described above, the at-a-glance views of the image signals displayed on the sub screens are updated when a switch is pressed or at fixed intervals. Therefore, if the at-a-glance views are updated when a moving image is displayed on the main screen, the updating operation can cause the moving image to stop the motion thereof, and thus the image becomes unnatural or is disturbed. The present embodiment is intended to solve such a problem.

FIG. 4 is a block diagram illustrating the general configuration of the image display device of the present embodiment, which is different from the image display device of the first embodiment described above with reference to FIG. 1 only in that a moving/still image detector 21 is added. The moving/still image detector 21 serves to determine whether the selected image signal is a moving image signal or a still image signal.

FIG. 5 is a flow chart illustrating the displaying process executed by the image display device according to the present embodiment. In FIG. 5, a main screen is first displayed (step S11).

After that, it is determined whether a still image has been displayed for a predetermined period of time or longer in the main screen on the basis of the signal output from the moving/still image detector 21 (step S12). If and only if the still image has been displayed over the predetermined period of time or longer, a sub screen is displayed (step S13) in a similar manner as described above in the first embodiment (FIG. 2), and the process is completed.

The moving/still image determination is performed on the basis of the difference in image data between frames or on the basis of a motion vector calculated from the above difference.

In the present embodiment, because the updating of the at-a-glance views of the input images displayed on the sub screen is performed only when it is determined that a still image has been displayed on the main screen over the predetermined period of time or longer, the updating operation does not cause a problem such as the stopping in motion of the moving image displayed on the main screen, or other artifacts or disturbances in the moving images.

An image display device according to a third embodiment of the present invention is described below.

The image display device of the third embodiment is different from the image display device of the first embodiment described above only in the sub screen displaying process, and thus the hardware used in this third embodiment is the same as that shown in FIG. 1.

Figure 6:
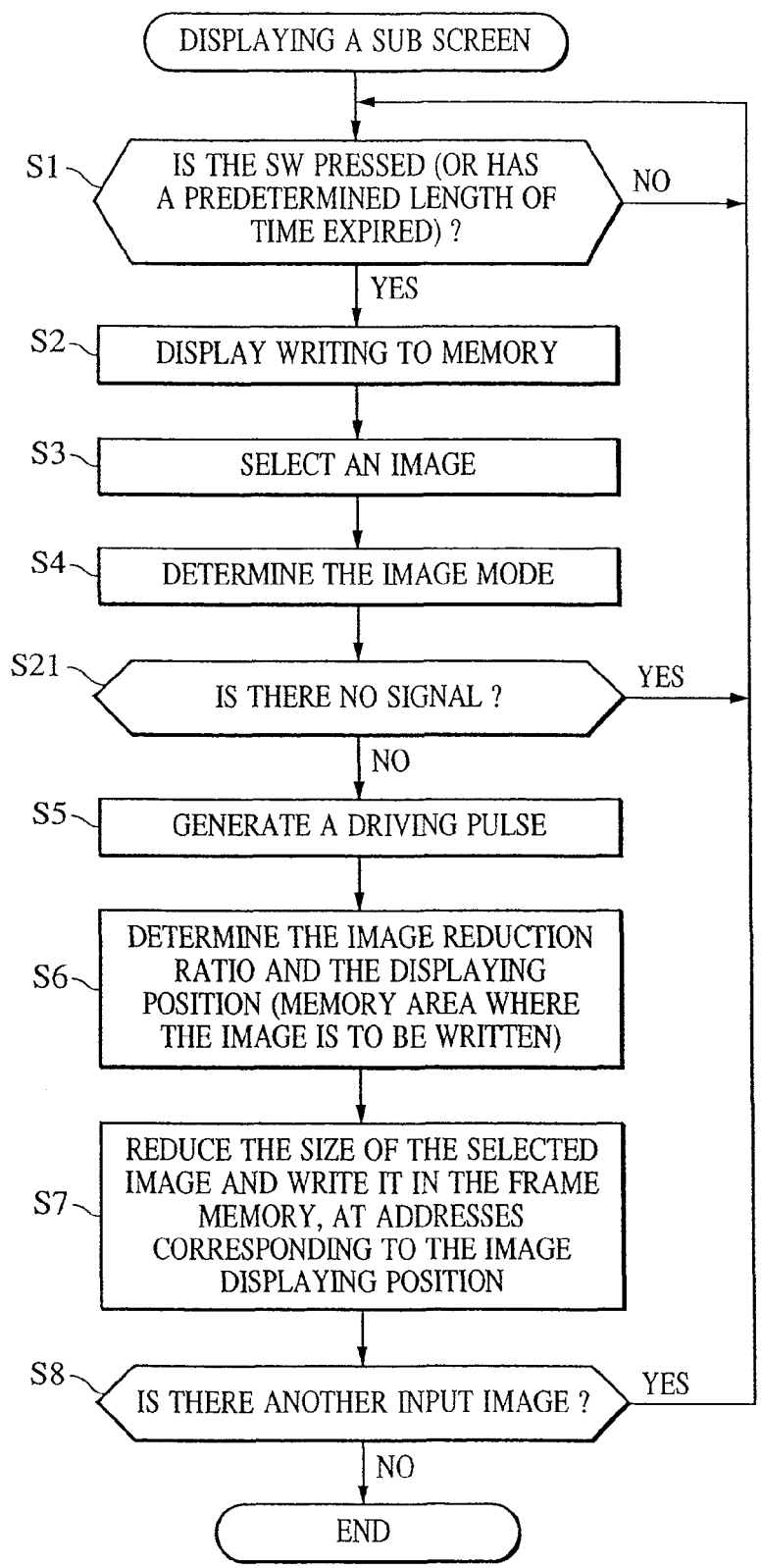
FIG. 6 is a flow chart illustrating a sub screen displaying process executed by an image display device according to a third embodiment of the present invention.

FIG. 6 is a flow chart illustrating a sub screen displaying process executed by the image display device according to the present embodiment. The sub screen displaying process according to the present embodiment is different from that shown in FIG. 2 only in that step S21 is added.

In FIG. 6, when the image mode is detected after switching the image signal, if it is determined that there is no image signal, the process returns to a step (S4→S21→S1) to perform the sub screen displaying process for the image input via the next input terminal without performing the writing into the frame memory.

In the present embodiment, as described above, when no image signal is input via a particular vide input terminal, the at-a-glance view of the image for that terminal is not displayed on the subscreen, and thus the convenience is improved.

An image display device according to a fourth embodiment of the present invention is described below.

The image display device of the fourth embodiment is different from the image display device of the first embodiment described above only in the sub screen displaying process, and thus the hardware used in this fourth embodiment is the same as that shown in FIG. 1.

Figure 7:
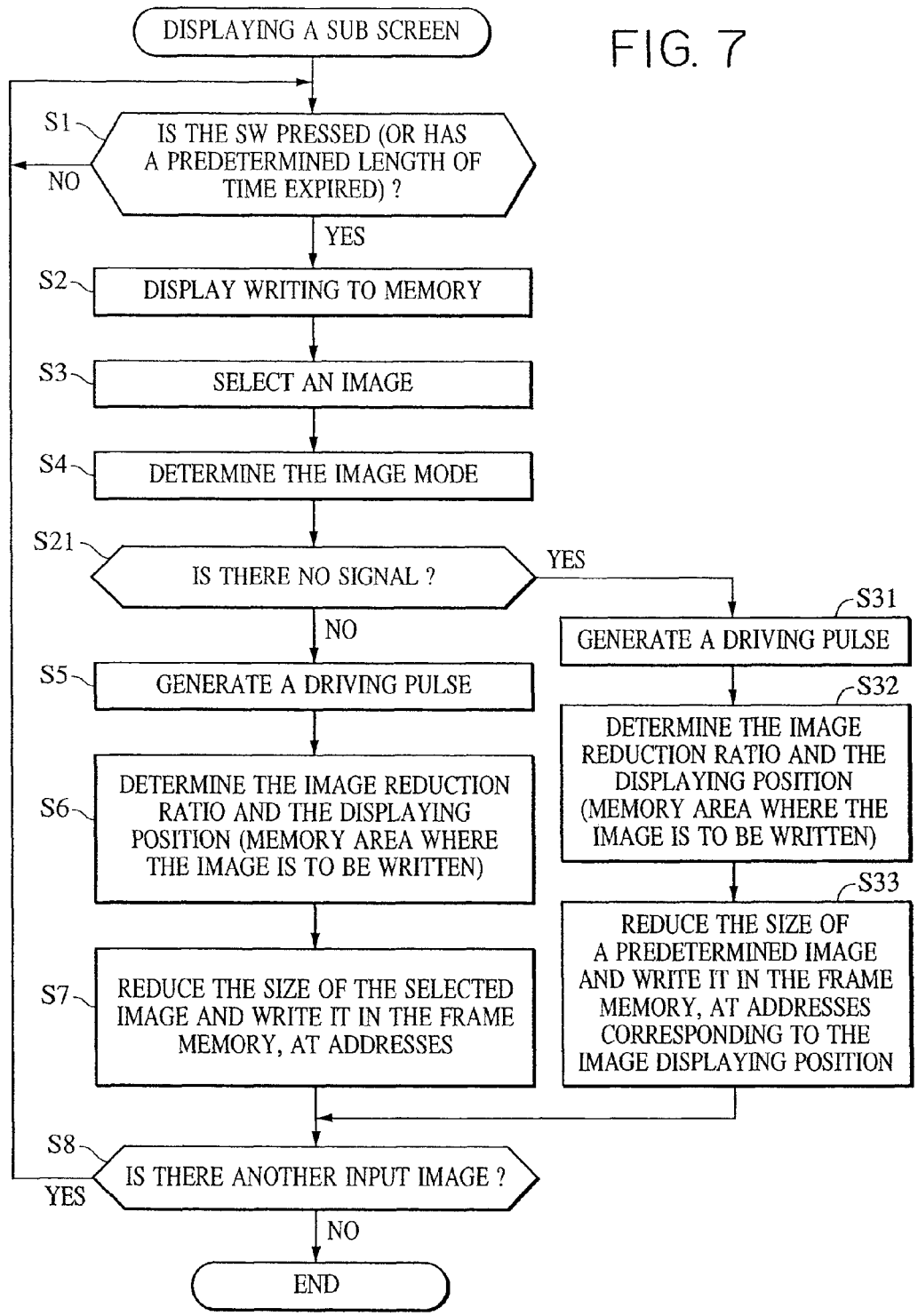
FIG. 7 is a flow chart illustrating a sub screen displaying process executed by an image display device according to a fourth embodiment of the present invention.

FIG. 7 is a flow chart illustrating a sub screen displaying process executed by the image display device according to the present embodiment. The sub screen displaying process according to the present embodiment is different from that shown in FIG. 6 only in that steps S31 to S33 are added.

In FIG. 7, if the result of the image mode detection indicates that there is an image signal, the writing into the frame memory is performed in the normal manner in the sub screen displaying process (steps S21→S5→S6→S7). However, when it is determined that there is no image signal, a predetermined image is written into the frame memory (steps S21→S31→S32→S33).

The predetermined image may be registered as follows. The image which is input via the video input terminal and is currently displayed is selected as an image to be registered. Alternatively, the image to be registered may be selected from the thumbnail images. In this case, when an image is selected, the selected image may be displayed in an enlarged fashion and registered, or may be maintained in the thumbnail fashion.

In the present embodiment, as described above, it is determined whether the respective input terminals are used or not, on the basis of the status of the signals obtained in the initialization process. The displaying of images on the sub screens is not performed, as in the third embodiment, for the input terminals which are detected as inputting no signals. However, in the case where a particular input terminals is detected as inputting no signal after the initialization process, the last image input via that input terminal of the predetermined image stored in the memory is displayed. This makes it possible to maintain the images displayed on the sub screens even when a short-time loss occurs in the image signals from the connected devices, and thus the convenience is further improved. Because it is possible to specify the images to be displayed when no image signals are received, the viewability is also improved.

The reading of the image signal may be performed at the same frame rate as that of the main selected image or may be performed so that no distortion is created in the selected main image.

An image display device according to a fifth embodiment of the present invention is described below.

Figure 8:
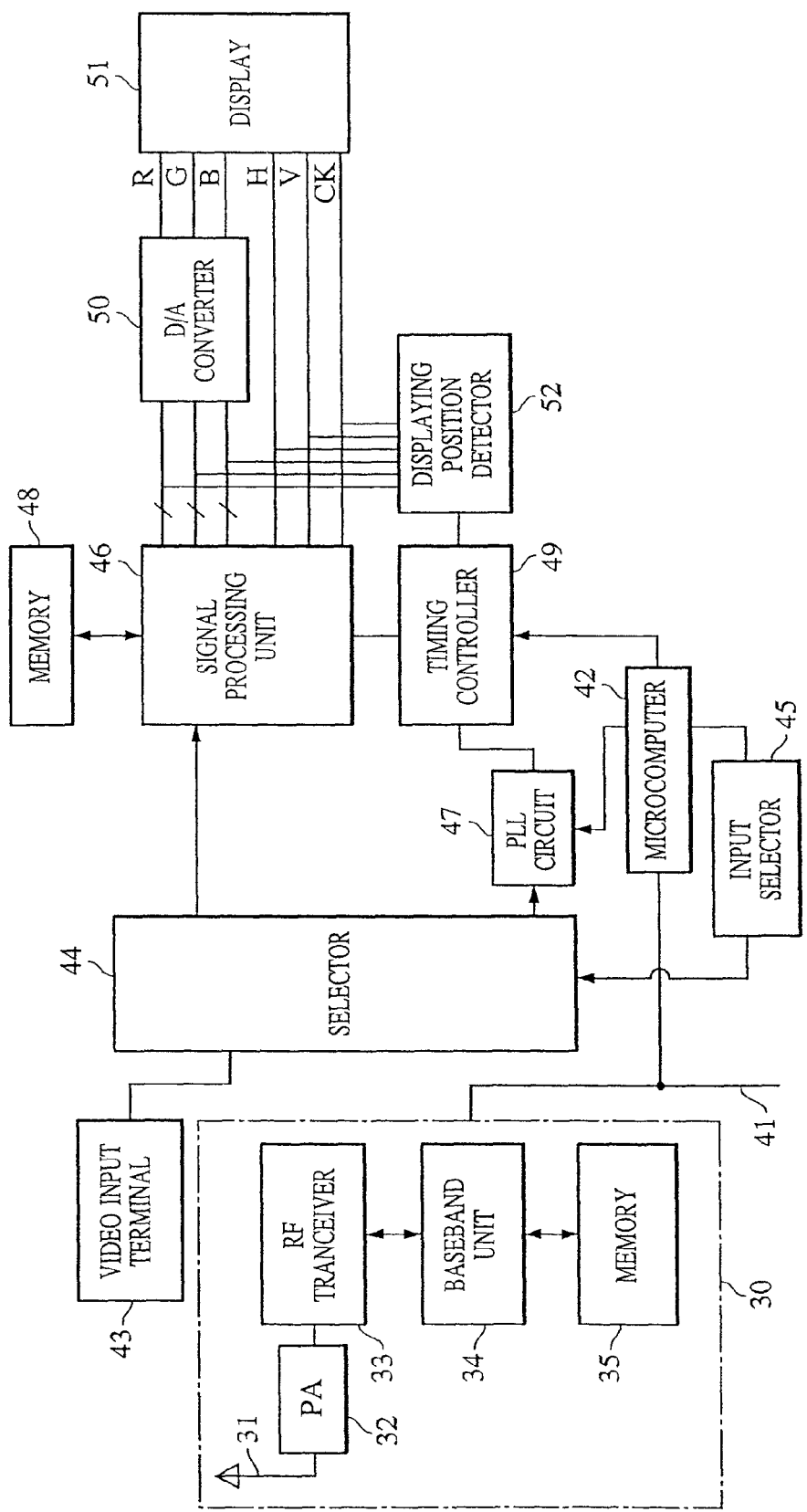
FIG. 8 is a block diagram illustrating the general configuration of an image display device according to a fifth embodiment of the present invention.

FIG. 8 is a block diagram illustrating the general configuration of the image display device according to the fifth embodiment.

In FIG. 8, a wireless transmitting/receiving module 30 includes an antenna 31, a power amplifier (PA) 32, an RF (radio frequency) transceiver 33, a baseband unit 34 including a microcomputer and a communication protocol processing circuit, and a memory 35 such as a flash EEPROM (electrically erasable and programmable read only memory). The wireless transmitting/receiving operation may be preferably performed using a 2.4 GHz band according to the technique based on the Bluetooth, IEEE802.11, IEEE802.11a, IEEE802.11b, or the like. For the purpose of achieving widespread use, the Bluetooth technique is designed such that most software resources according to the IrDA (Infrared Data Association) standard may also be used in the Bluetooth technique. In the Bluetooth technique, an object exchange protocol (OBEX) is employed so that application software can exchange objects regardless of the difference in the type of devices.

Data and a control signal are transmitted via a bus 41 to a microcomputer 42 of the main unit of the image display device. A USB (Universal Serial Bus) or a PCI (Peripheral Component Interconnect) bus may be employed as the interface bus 41. An image signal according to the NTSC (National Television System Committee) standard or an image signal output from a PC is input to a selector 44 via a video input terminal 43. The output of the selector 44 is switched by an input selector 45.

The output of the selector 44 is connected to a signal processing unit 46 and a PLL circuit 47. The signal processing unit 46 is also connected to a memory 48 an a timing controller 49. The outputs of the signal processing unit 46 are connected, directly or via a D/A converter 50, to a display 51.

Preferably, the display 51 is a TFT LCD or a DMD. When a DMD is employed as the display 51, the D/A converter 50 is replaced with a DMD driver.

The image display device also includes a displaying position detector 52.

Before describing the operation of the image display device of the present embodiment, an example of a manner of using the image display device of the present embodiment is described with reference to FIG. 9.

Figure 9:
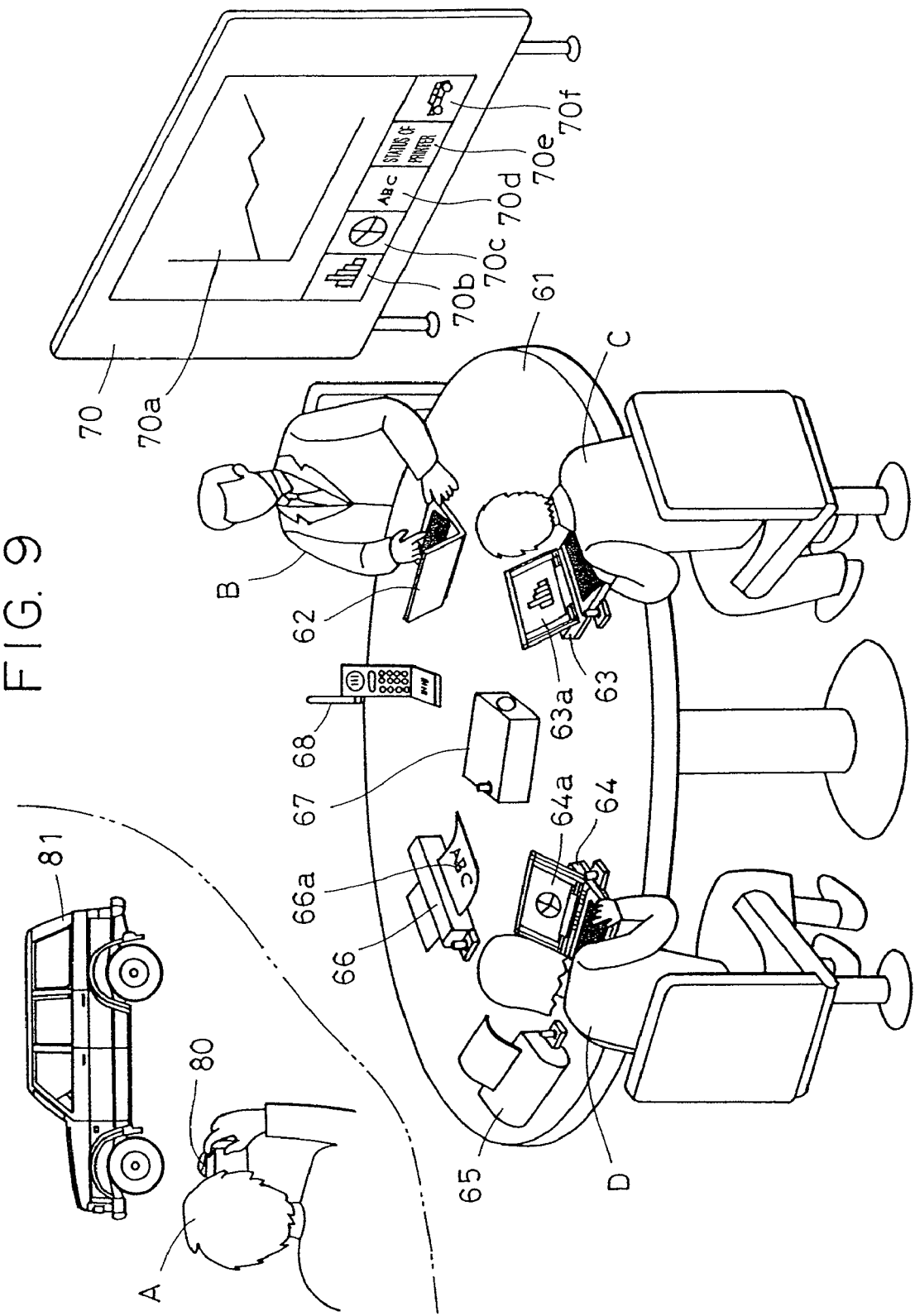
FIG. 9 is a schematic diagram illustrating an example of a manner of using the image display device shown in FIG. 8.

FIG. 9 illustrates an example of a manner in which a meeting is held. A notebook PCs 62 to 64, an ink-jet printer 65, a scanner 66, and a projector 67 are disposed on a table 61. Each of these devices includes a wireless communication module 30 of the above-described type.

An image is projected onto a screen 70 by the projection 67. Outdoors in the outside of the meeting room, a digital camera 30 is used to take an image of a car 81. The image taken by the digital camera 80 can be transmitted using a portable telephone (not shown). A portable telephone 68 for receiving the image data taken by the digital camera 80 is disposed on the table 61.

The meeting is attended by a total of four persons, that is, Mr. A who has the digital camera 80 and who is present at a remote location, Mr. B having the notebook PC 62, Mr. C having the notebook PC 63, and Mr. D having the notebook PC 64. Mr. B, who is a host of the meeting, provides a list of devices which are accessible by means of wireless communication and which are used in the meeting. Of the devices placed on the table 61, the notebook PC 63 of Mr. C, the notebook PC 64 of Mr. D, the printer 65, the scanner 66, the projector 67, and the portable telephone 68 are selected as devices used in the meeting and they are connected to each other via a LAN (Local Area Network). Mr. A, who was asked in advance via a telephone call to attend the meeting, is now attending the meeting via the portable telephone. In this case, for example, the PC 62 of Mr. B is currently used as a master device in the LAN system and the other devices are used as slave devices. The projector 67 displays data received from the connected devices in such a manner that the data output from the Mr. B's PC is displayed in an area 70a, data 63a displayed on the Mr. C's PC 63 is displayed in an area 70b, data 64a displayed on the Mr. D's PC 64 is displayed in an area 70c, data 66a read by the scanner 66 is displayed in an area 70d, the current status of the printer 65 is displayed in an area 70e, and the picture of the car 81 taken by the digital camera 80 at the remote location and received via the portable telephone is displayed in an area 70f.

As described above, the projector 67 displays images according to the data output from those devices which are connected using their wireless communication module 30 to each other via the network and which are controlled by the master device so as to act as slave devices in the network system. Thus, it is possible for the devices used in the meeting to easily acquire data from other connected devices, and data can be easily output to the printer.

Of the data input to the projector 67, the image data output from the master device is displayed in an display area 70a. If the master device is switched from the device of Mr. B to some device of Mr. A, C, or D, the image of the new master device is displayed in the display area 70a. The switching of the master device may be performed not only by the respective terminals but also by operating a pointer (not shown) or a digitizer (not shown) coupled with the projector 67. That is, a selected image is displayed in a large display area, and images of non-selected terminals connected via the network are displayed in small display areas. In this system, if some data is modified during the meeting, the modified data may be transmitted to the respective terminals connected via the wireless network. Although in the present embodiment described above, the image data of a device selected as the master device is displayed in the main display area, the selection of the image data to be displayed in the main display area and the change in the size of images displayed in the respective display areas may also be performed by transmitting display mode information to the projector 67 from a slave device.

Referring back to FIG. 8, the control operation in this system is described. The circuit shown in FIG. 8 is embedded in the projector 67. As describe above with reference to FIG. 9, after turning on the electric power of the respective devices using in the meeting, slave devices are selected using a device selected as an initial master device. When these devices are selected, device addresses on the network are assigned to the respective devices. The projector 67 receives, via the antenna 31, image data or control data output from the devices connected to the network. The data output from each device includes data indicating whether the device is a master or slave, that is, data identifying the terminal device, image data, signals (synchronization signals HD and VD) which define the timing of the image data, and the status of the device such as the printer 65. A data signal is extracted from a RF carrier waver by means of decoding via the RF transceiver 33 and the baseband unit 34, and the obtained data in the form of a serial digital signal is applied to the microcomputer 42 via the bus 41.

The microcomputer 42 determines which terminal device the image data or control data is received from, and the microcomputer 42 writes the received data into the memory 48, at proper addresses. When the projector 67 receives image data or control data from a plurality of terminal devices, the data is written in different memory areas, of the memory 48, assigned to the respective terminal devices so that they are integrated in a single image signal when read from the memory 48.

Although in the present embodiment, the memory 48 used in the image processing but is also used as a memory for temporarily storing the image data or the control data, an additional memory may be disposed between the bus 41 and the microcomputer 42 so that the image data or the control data received from the plurality of terminal devices is first stored in the additional memory temporarily and then transferred to the memory 48.

In addition to the data input via the wireless communication module 30, data such as an analog signal output from a PC or an analog video signal is also input via the video input terminals 43 and applied to the selector 44 via an A/D converter (not shown). The video input terminals 43 are not limited to the analog terminals, and a digital terminal (LVDS, TMDS) may also be employed.

The input selector 45 selects one of signals input via the video input terminals 43, and the selected signal is stored in the memory 48 via the signal processing unit 46.

The signal processing unit 46 converts the image data acquired via the two paths described above into a signal (in accordance with a dot clock) in a form which matches the display 51 and reduces respective images to the sizes corresponding to the small display areas as shown in FIG. 9. The plurality of the image data are then combined together, and the resultant RGB signal output from the signal processing unit 46 is converted into a analog signal, which drives the display 51. Thus, at least two image signals are combined together and displayed on a single screen.

The displaying position detector 52 detects the first and last synchronization signals and properly controls the displaying position in accordance with the detected synchronization signals. The displaying position detector 52 also adds synchronization signals HD and VD to the signal which has been selected by the input selector 45 and which has been processed by the signal processing unit 46, wherein the microcomputer 42 sets the frequency of the PLL circuit 47.

The transmission image data and the display mode signal are described, which are transmitted from PCs 62, 64 or the like and used to determine the images to be displayed and the layout of images displayed by the projector 67.

Driver software for driving the projector 67 is installed, in advance, in the respective PCs 62-64 and peripheral devices 65-68 shown in FIG. 9, information about the display size and the number of pixels of the projector is stored therein.

In order to display image data associated with a master or slave device via the projector 67, an image display command output icon displayed by the driver software on the screen of each PC 62-64 is turned on. When the image display command output icon is in the on-state, the image information displayed on the respective PCs 62-64 are converted by the driver software into a form which matches the projector 67 and sent to the projector 67.

Alternatively, to achieve the same purpose, a data output (transmission) switch may be provided.

Figure 10A:
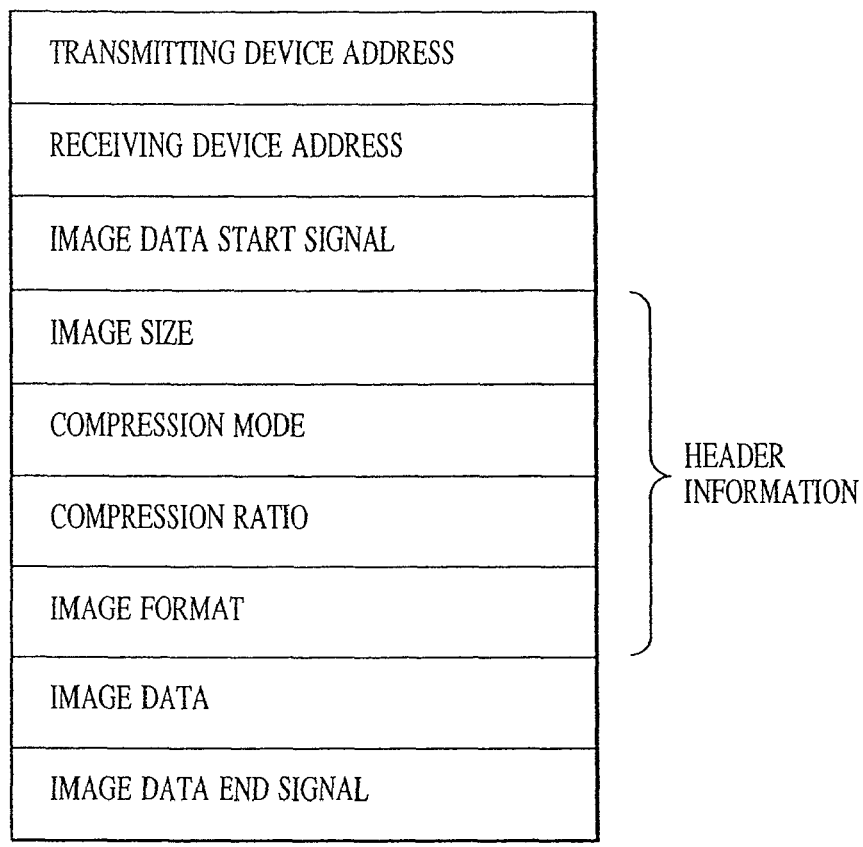
FIG. 10A and 10B are schematic diagrams illustrating a example of a format for transmission image data and an example of a formation for display mode signal, respectively.
Figure 10B:
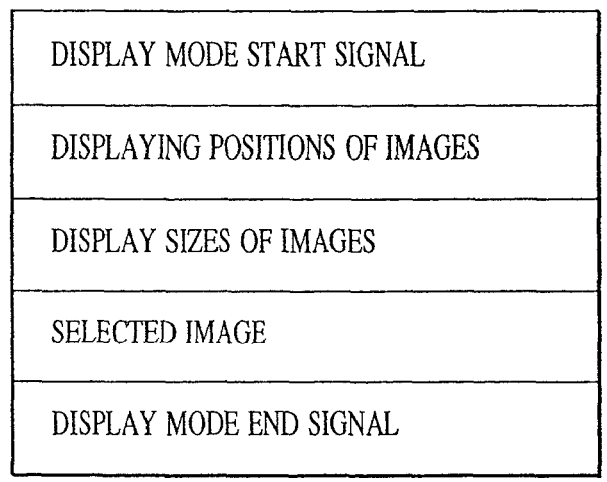

FIG. 10A illustrates an example of the format of the transmission image data, and FIG. 10B illustrates an example of the format of the display mode signal.

In FIG. 10A, the transmission image data includes the address of a transmitting device, the address of a receiving device, an image data start signal, header information, image data, and an image data end signal, wherein the header information includes data representing the image size, the compression scheme, the compression rate, and the image format.

When the projector 67 receives the transmission image data via the antenna 31, the data is stored in the memory 48 via the bus 41. Herein, in accordance with the header information, decompression and increasing/decreasing of the size of the image are performed and the addresses of the memory where the data is written are determined.

The projector 67 can change the displaying positions and the sizes of the plurality of images in response to a display mode signal received from the master or slave device via the antenna 31.

In FIG. 10B, the display mode signal includes layout information such as a display mode start signal, data representing the positions where the respective images are to be displayed, data representing the size of the respective images, data indicating the selected image, and display mode end signal. Alternatively, the display mode signal may include data specifying a display mode selected from a plurality of modes available in the display device.

In the present embodiment, as described above, images displayed on the screen can be freely selected by the master or slave device. This provides a great convenience.

The conventional display device is only capable of displaying input image signals. In contrast, the system according to the present invention has a further capability as described below.

A plurality of terminal devices each having a module similar to the wireless communication module 30 for transmitting an image signal to the image display device are connected to the network, and the network environment is established such that a master terminal device and slave terminal devices controlled by the master device are defined in the network. In order to display the data associated with a terminal device connected to the network, it is required to transmit the data from that terminal device to the projector 67. In the present embodiment, the image from the master terminal device or the image input via the video input terminal is employed as the selected image, and when the image signal period of image signals transmitted from at least two devices is represented by T, the transmission period of the selected image signal is represented by τ, the number of non-selected image signals is represented by n, and a constant k (≧) is given, the parameters T, τ, n, and k are set such that the following equation is satisfied:

$$\tau = kT/(n+k)$$

Non-selected data is acquired during the remaining period (T−τ). Thus, the data acquisition ratio of the selected data to that of the non-selected data is set to k, which allows the synthesized image to be formed with selected data having high quality and non-selected data compressed by a high compression ratio thereby achieving a high-quality synthesized image with no artifact. From the above viewpoint, it is desirable to determine the value of k depending upon the ratio of the image sizes. Each non-selected data is acquired during a period of about (T−τ)/n, wherein the acquiring period is not necessarily equal for all non-selected data because the data size can be different. As the value of the constant k increases from "1", the ratio of the period of time during which the data is received from the master terminal device to the period of time during which data is received from the slave terminal devices increases, and thus the quality of the selected image increases. The determination as to whether the image from the master terminal device or the image input via the video input terminal is employed as the selected image, is made according to a switching operation performed using a remote control unit of the widely-used type (not shown). The technique described above is very useful to quickly display desired data with high quality, in particular when the transmission capacity of the communication line such as the wireless communication line is limited. The transmission rate of the transmission of data from slave terminal devices may be reduced by transmitting only headline data or partially removing the image data in a systematic fashion and transmitting the remaining data. In any case, when image data is transmitted from the slave terminal devices, the transmission is performed after converting the image data into a form which is compressed by a greater ratio than that of the image data from the master terminal device. When it is desired to view the details of an image transmitted from a slave terminal device, the slave terminal device is switched to the master terminal device by the display device or the current master terminal device.

The technique of transmitting data to the display device such as the projector according to the present invention has been described above. Now a technique of temporarily storing data in a memory and processing the data before displaying it is described below.

The data received via the wireless communication module 30 or via the video input terminal 43 is stored in the memory 48. When image data is synthesized from the selected image data and the non-selected image data stored in the memory 48, the non-selected image data is compressed with a great compression ratio so as to achieve the effects similar to those described above.

The control operation performed by the image display device constructed in the above-described manner is described below.

When an at-a-glance view start signal is input, either the master terminal device or the video input terminal, which is set as a default device, is first selected. If desired, the selected device may be switched by operating the remote control unit or the like. After writing one frame of image data received from the above device, the writing into the memory is temporarily disabled. However, the reading of the image signal from the memory and the displaying of the image signal on the display may be continued. In this case, only the same one frame of image data is displayed.

Information (information representing the status of the device such -as the printer as well as the image data) is also transmitted from the connected terminal devices to the image display device, from one terminal device to another. In this transmission process, the amount of data transmitted device by device is not necessarily limited to one frame. Before acquiring the image data, icons or the like corresponding to the respective terminals are displayed instead of the real image data. When compressed data to be displayed in desired display areas has been acquired in the above-process, the icons are switched to the real image data. Alternatively, a combination of icons and real data may be displayed.

The layout of a multiscreen layout is then determined.

Figure 11A:
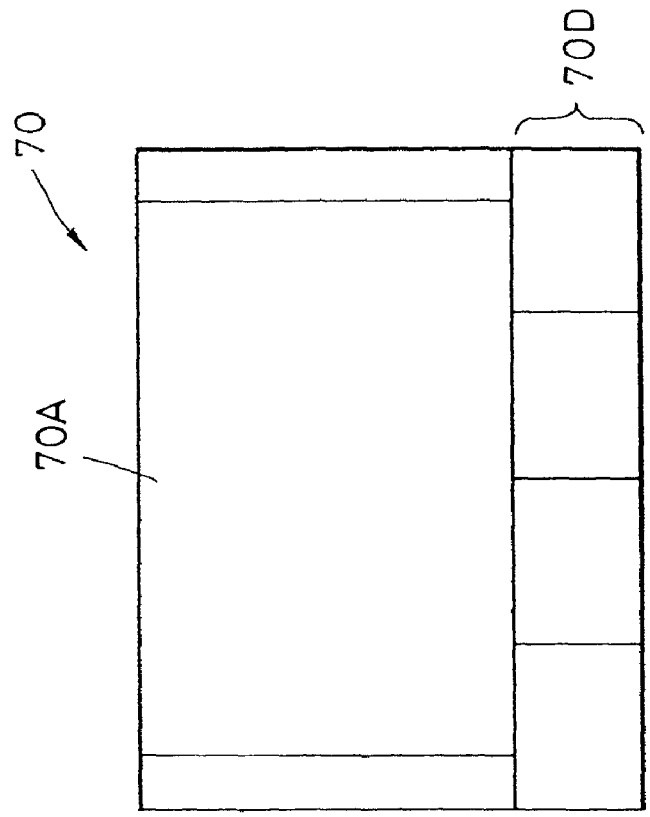
FIGS. 11A and 11B are schematic diagrams illustrating examples of layouts of multi screens.
Figure 11B:
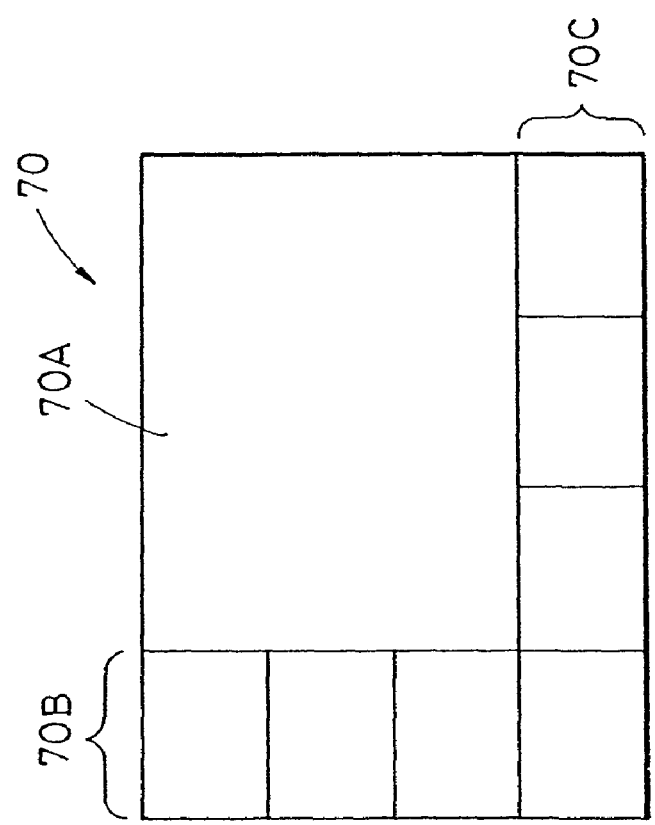

FIGS. 11A and 11B illustrate examples of multiscreen layout. In the example shown in FIG. 11A, an area 70B on the left side of the screen and an area 70C at the bottom of the screen are set as default non-selected image display areas. These non-selected image display areas vary depending upon the number of non-selected images. The selected image is displayed in the remaining area 70A. When there are a small number of non-selected images, the non-selected image display area 70D is automatically reduced as shown in FIG. 11B, and the selected image display area 70A is shifted toward the center of the screen, depending upon the aspect ration. The above-described layout is defined by default, and the layout can be modified by a user in a similar manner to that in which the size of a window displayed on a PC is modified.

After determining the layout in the above-described manner, the positions where the image data acquired from the respective terminal devices is to be displayed are determined, and the image data is compressed (reduced) depending upon the image sizes.

The data is acquired from one terminal device to another during the image acquisition period with the above-described ratio, and the acquired data is written in the memory at the corresponding memory addresses.

The above process is performed repeated as many times as there are images thereby displaying the images arranged in the form of an array to provide an at-a-glance view.

An image display device according to a sixth embodiment of the present invention is described below.

The image display device of the present embodiment is different from that of the fifth embodiment described above in that the display 51, the D/A converter 50, and the displaying position detector 52 are removed. That is, unlike the fifth embodiment in which the wireless communication module 30 is embedded in the projector 67, the device of the sixth embodiment includes only the wireless module 30 and the part for selecting one of a plurality of input signals.

Figure 12:
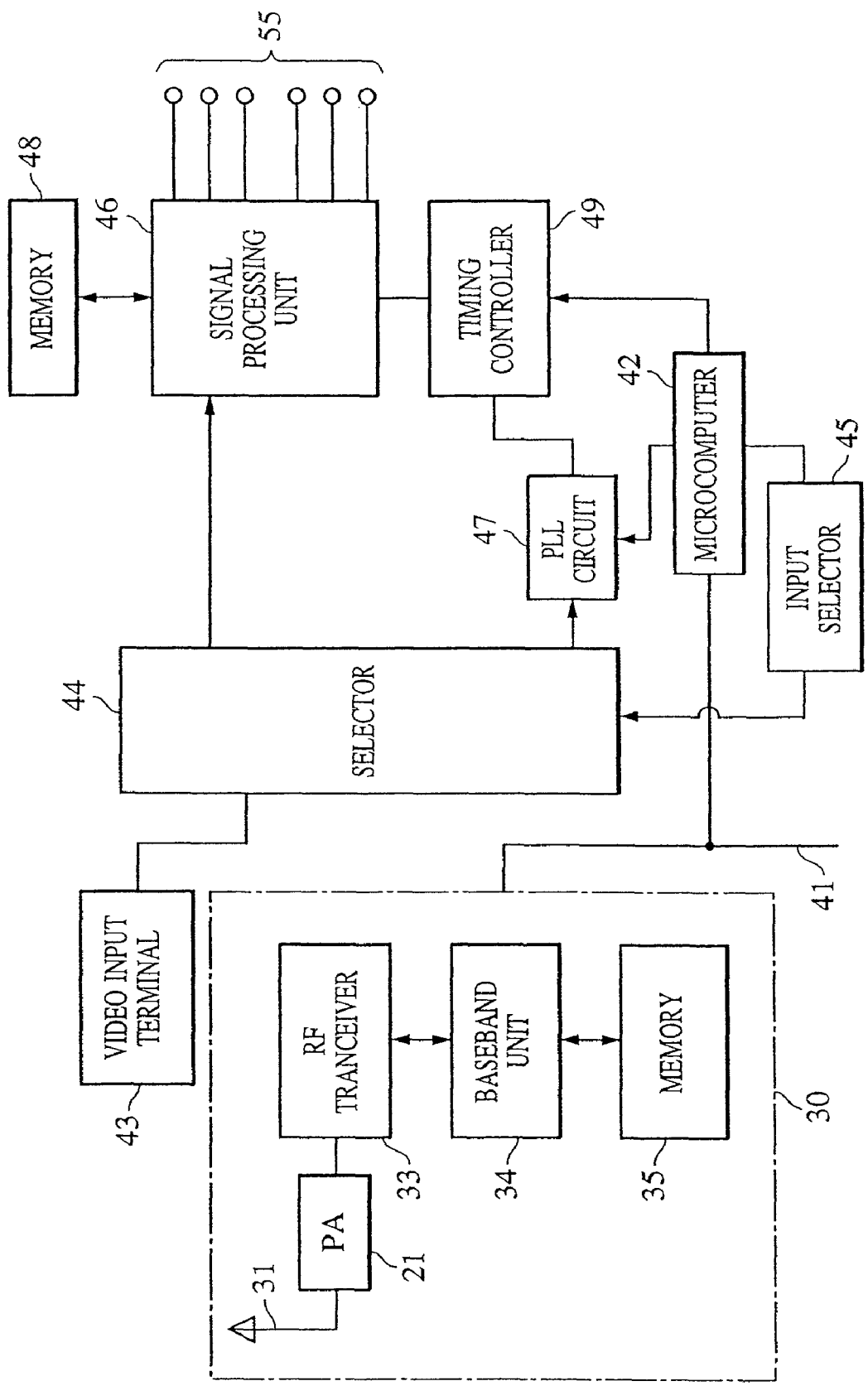
FIG. 12 is a block diagram illustrating the general configuration of an image display device according to a sixth embodiment of the present invention.

FIG. 12 is a block diagram illustrating the general configuration of the image display device according to the present embodiment. As shown in FIG. 12, the image display device includes digital output terminals 55 for outputting a digital signal representing an image synthesized from a plurality of input image signals.

By connecting this device to a conventional front projector having only one PC terminal and one video terminal, it becomes possible for the projector to handle a plurality of input image signals in the wireless communication environment.

A plurality of LAN cable terminals for the 10 Base-T or 100 Base-T connection may be provided so that the image display device has the hub capability for connecting a network temporarily formed using wireless communication modules with an existing LAN.

An image display device according to a seventh embodiment of the present invention is described below.

The image display device of the seventh embodiment is different from the image display device of the fifth embodiment described above only in that a moving/still image detector is added.

Figure 13:
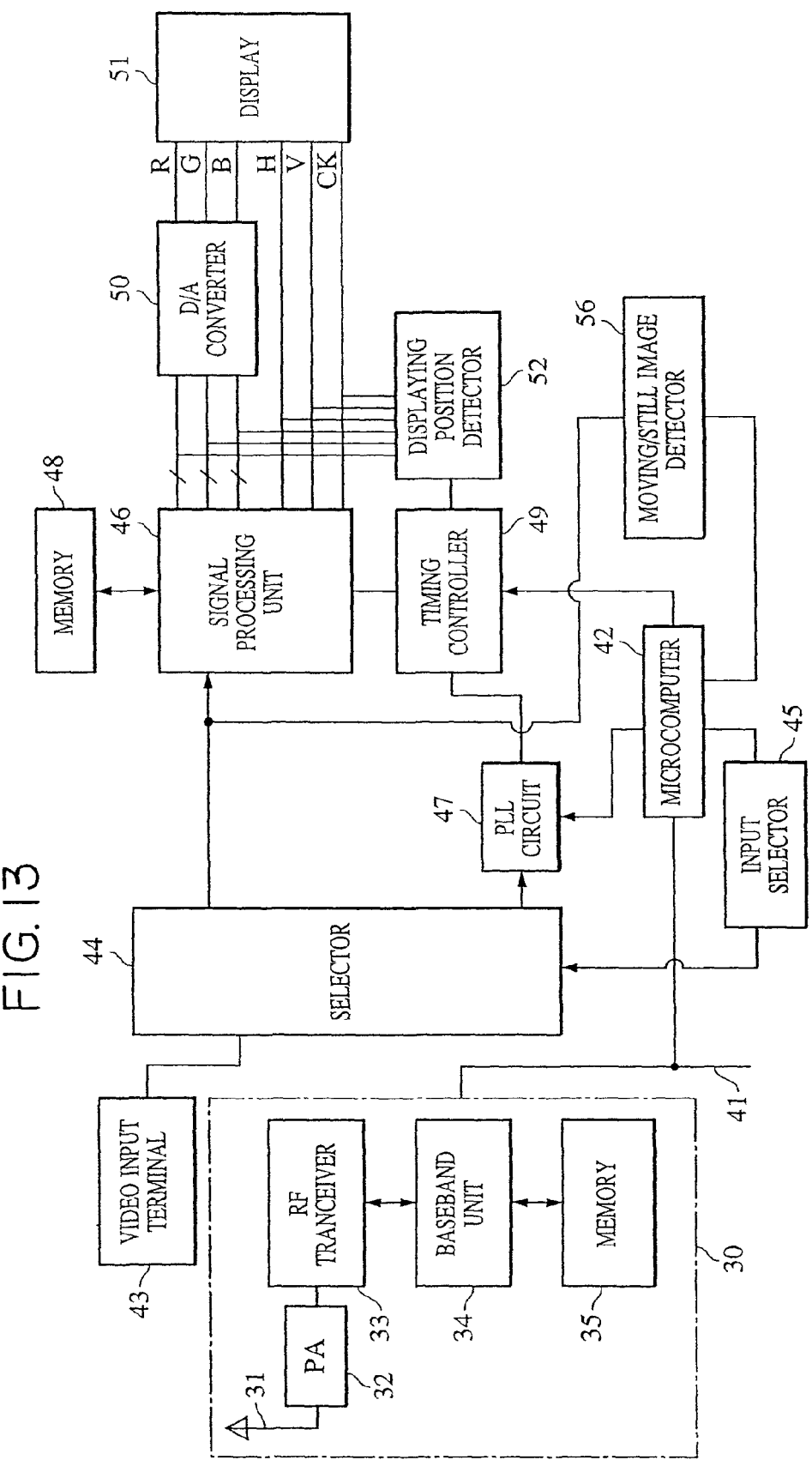
FIG. 13 is a block diagram illustrating the general configuration of an image display device according to a seventh embodiment of the present invention.
Figure 14:
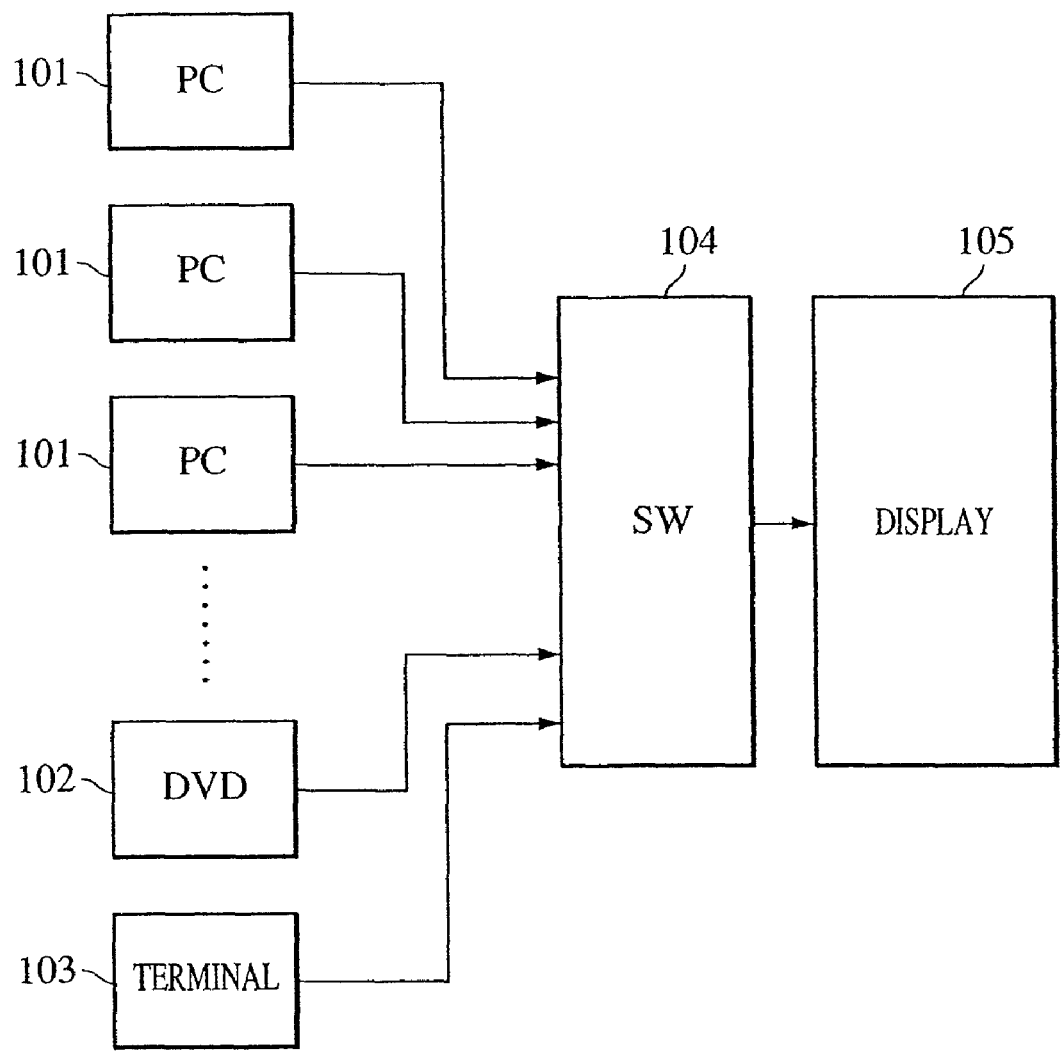
FIG. 14 is a block diagram illustrating an example of a conventional image display device.

FIG. 13 is a block diagram illustrating the general configuration of the image display device according to the present embodiment. As shown in FIG. 13, the moving/still image detector 56 determines whether the image data received from each terminal device is moving image data or still image data on the basis of the difference in image data between frames or on the basis of a motion vector calculated from the above difference. That is, the amount and the type of the image data received from the respective terminal devices are determined by the moving/still image detector 56, and the data acquisition ratio is adjusted depending upon the detected amount and type of the data. When the image data received from the master device or the image data input via the video input terminal is moving image data or a semi-moving image data, the value of the constant k described earlier is adjusted so that the resultant displayed image becomes natural. (Herein, the semi-moving image refers to an image including a moving part or a still image which is switched from time to time). Conversely, when the image data received for a predetermined period of time or longer from the master device or the image data input via the video input terminal is still image data and when non-selected images are great in data amount, the data acquisition ratio for the non-selected images is increased so as to obtain a synthesized image with higher quality.

In the present embodiment, a printer 65 for outputting an image is used as one of devices connected to the network via their wireless communication modules also include, in addition to the PCs 62-64, the digital camera 80, and the scanner 66, for transmitting an image to the projector 67. An icon corresponding to the output device such as the printer 65 is displayed in a particular area on the screen. When it is desired to print a particular image during a meeting, if the icon is clicked, a print setting screen is displayed in an overlayed fashion thereby allowing a user to specify a file to be printed and printing conditions. Thus, it is possible to print the image immediately when printing is required, without having to connect the printer via a cable.

Note that the objects of the present invention may also be achieved by supplying a storage medium, on which a software program implementing the functions of any of the embodiments described above is stored, to a system or a device whereby a computer (CPU or MPU) in the system or the device reads and executes the program code stored on the storage medium.

In this case, it should be understood that the program code read from the storage medium implements the novel functions of invention and thus the storage medium storing the program code falls within the scope of present invention.

Specific examples of such a storage medium for storing the program code include a floppy disk, a hard disk, an optical disk, a magneto-optical disk, a CD-ROM, CD-R, a magnetic tape, a non-volatile memory card, and a ROM. The program code may be supplied from a server computer via a communication network.

Furthermore, the scope of the present invention 20 includes not only such a system in which the functions of any embodiment described above is implemented simply by reading and executing a program code on a computer but also a system in which a part of or the whole of process instructed by the program code is performed using an OS (operating system) on the computer.

Furthermore, the scope of the present invention also includes a system in which a program code is transferred once from a storage medium into a memory provided in a function extension board inserted in a computer or provided in a function extension unit connected to the computer, and then a part of or the whole of process instructed by the program code is performed by a CPU or the like in the function extension board or the function extension unit thereby implementing the functions of any embodiment described above.

In the present embodiment, as described above, the modes of the respective image signals input via the plurality of input terminals are converted to a mode which is optimum for the image display device to display the image signals, and the plurality of converted image signals are combined and displayed on the same screen of the display device so that the contents of the input image signals can be easily viewed.

The modes of the image signals received via the transmitting/receiving means are converted to a mode which is optimum for the display device to display the image signals, and the plurality of converted image signals or the control signal received via the transmitting/receiving means are combined and displayed on the same screen of the display device thereby making it possible to input a plurality of image signals without needing a cable connection.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A system for displaying images, comprising:
an image display device, comprising: a plurality of input terminals for inputting a plurality of image signals, respectively; selection means for selecting an image signal to be displayed as a main image from the plurality of image signals input via said plurality of input terminals;

compression means for compressing the other input image signals not selected by the selecting means, respectively; combining means for combining the selected image signal and the compressed image signals into a resultant image; and displaying means for displaying the resultant image on a screen of a display device; and a plurality of terminal devices connected to the image display device via a wireless network such that an image signal is transmitted to said image display device from each of the plurality of terminal devices, each of the plurality of terminal devices including transmitting/receiving means for transmitting and receiving an image signal or a control signal by means of wireless communication, wherein, said compression means compresses an image signal which is not selected as the main image with a compression ratio greater than a compression ratio for an image signal selected as the main image, wherein, an image signal period of image signals transmitted from at least two transmitting/receiving means of said plurality of terminal devices is represented by T, a transmission period of an image signal selected as a main image from the image signals combined and displayed on the screen of the display device is represented by "c, a number of image signals which are combined and displayed on the same screen of the display device and which are not selected as the main image is represented by n, and a constant k is given, the parameters T, "c, n and k are set such that the following equation is satisfied: "c=kT/(n+k), and wherein the value of k is determined based on a ratio between an image size of an image signal selected as the main image and an image size of an image signal which is not selected as the main image.

2. The system according to claim 1, further comprising:
memory means for storing modes of the respective image signals; and
conversion means for converting the modes of the respective image signals input via the input terminals into a mode suitable for said display device to display the image signals on the basis of the modes stored in said memory means.

3. An image display device, comprising:
a plurality of input terminals for inputting a plurality of image signals via a wireless network from a plurality of terminal devices, respectively; selection means for selecting an image signal to be displayed as a main image from the plurality of image signals input via said plurality of input terminals; compression means for compressing the other input image signals not selected by the selection means; combining means for combining the selected image signal and the other image signals compressed by the compression means into a resultant image; and displaying means for displaying the resultant image on a screen of a display device; wherein, said compression means compresses an image signal which is not selected as the main image with a compression ratio greater than a compression ratio for an image signal selected as the main image, wherein, an image signal period of image signals transmitted from at least two transmitting/receiving means of said plurality of terminal devices is represented by T, a transmission period of an image signal selected as a main image from the image signals combined and displayed on the screen of the display device is represented by "c, a number of image signals which are combined and displayed on the same screen of the display device and which are not selected as the main image is represented by n, and a constant k is Riven, the parameters T, "c, n and k are set such that the following equation is satisfied: "c=kT/(n+k), and wherein the value of k is determined based on a ratio between an image size of an image signal selected as the main image and an image size of an image signal which is not selected as the main image.

4. The image display device according to claim 3, further comprising:
memory means for storing modes of the respective image signals; and
conversion means for converting the modes of the respective image signals input via the input terminals into a mode suitable for said display device to display the image signals on the basis of the modes stored in said memory means.

5. A method of controlling an image display device, comprising the steps of: inputting a plurality of image signals by a plurality of terminals via a wireless network from a plurality of terminal devices, respectively; selecting an image signal to be displayed as a main image from the plurality of image signals input; compressing the other input image signals not selected in the selecting step; combining the selected image signal and the compressed other signals into a resultant image; and displaying the resultant image on a screen of the image display device wherein, said compressing step compresses an image signal which is not selected as the main image with a compression ratio greater than a compression ratio for an image signal selected as the main image, wherein, an image signal period of image signals transmitted from at least two transmitting/receiving means of said plurality of terminal devices is represented by T, a transmission period of an image signal selected as a main image from the image signals combined and displayed on the screen of the image display device is represented by "c, a number of image signals which are combined and displayed on the same screen of the image display device and which are not selected as the main image is represented by n, and a constant k is given, the parameters T, "c, n and k are set such that the following equation is satisfied: "c=kT/(n+k), and wherein the value of k is determined based on a ratio between an image size of an image signal selected as the main image and an image size of an image signal which is not selected as the main image.

6. A method according to claim 5, further comprising:
storing modes of the respective image signals; and
converting the modes of the respective image signals input via the input terminals into a mode suitable for the image display device to display the image signals on the basis of the modes stored in said storing step.

7. A non-transitory computer-readable storage medium storing a computer-executable program thereon, said program including a process of controlling an image display device, said process comprising the steps of: inputting a plurality of image signals by a plurality of terminals via a wireless network from a plurality of terminal devices, respectively; selecting an image signal to be displayed as a main image from the plurality of image signals input; compressing the other input image signals not selected in the selecting step; combining the selected image signal and the compressed other signals into a resultant image; displaying the resultant image on a screen of the image display device; wherein, said compressing step compresses an image signal which is not selected as the main image with a compression ratio greater than a compression ratio for an image signal selected as the main image, wherein, an image signal period of image signals transmitted from at least two transmitting/receiving means of said plurality of terminal devices is represented by T, a transmission period of an image signal selected as a main image from the image signals combined and displayed on the screen of the display device is represented by "c, a number of image signals which are combined and displayed on the same screen of the display device and which are not selected as the main image is represented by n, and a constant k is given, the parameters T, "c, n and k are set such that the following equation is satisfied: "c=kT/(n+k), and wherein the value of k is determined based on a ratio between an image size of an image signal selected as the main image and an image size of an image signal which is not selected as the main image.

* * * * *